US012273363B2

United States Patent
Almulhim et al.

(10) Patent No.: US 12,273,363 B2
(45) Date of Patent: Apr. 8, 2025

(54) SYSTEM AND METHOD FOR DETECTING A MALICIOUS COMMAND AND CONTROL CHANNEL USING A SIMPLE MAIL TRANSFER PROTOCOL

(71) Applicant: SAUDI ARABIAN OIL COMPANY, Dhahran (SA)

(72) Inventors: Ammar Abdulateef Almulhim, Dammam (SA); Ghadah Hatem Alshehri, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 254 days.

(21) Appl. No.: 18/047,891

(22) Filed: Oct. 19, 2022

(65) Prior Publication Data
US 2024/0137371 A1  Apr. 25, 2024
US 2024/0236116 A9  Jul. 11, 2024

(51) Int. Cl.
*H04L 29/06* (2006.01)
*H04L 9/40* (2022.01)

(52) U.S. Cl.
CPC .................. *H04L 63/1416* (2013.01)

(58) Field of Classification Search
None
See application file for complete search history.

(56) References Cited

U.S. PATENT DOCUMENTS

| | | | |
|---|---|---|---|
| 8,677,487 B2 | 3/2014 | Balupari et al. | |
| 9,363,282 B1* | 6/2016 | Yu | H04L 63/0218 |
| 10,681,062 B2 | 6/2020 | Carver et al. | |
| 2003/0200272 A1* | 10/2003 | Campise | H04L 51/48 |
| | | | 709/206 |
| 2007/0277238 A1* | 11/2007 | Margalit | H04L 63/145 |
| | | | 726/22 |
| 2017/0285584 A1 | 10/2017 | Nakagawa et al. | |
| 2019/0166144 A1* | 5/2019 | Mirsky | G06N 20/20 |
| 2021/0250364 A1* | 8/2021 | Webster | H04L 43/022 |
| 2023/0319065 A1* | 10/2023 | Mears | H04L 51/21 |
| | | | 726/23 |

OTHER PUBLICATIONS

M. Warmer, "Detection of Web Based Command & Control Channels," University of Twente, 2011.
Alauthman, M. "Botnet Spam E-Mail Detection Using Deep Recurrent Neural Network." International Journal of Emerging Trends in Engineering Research 8.5 1979-1986.
P. Barthakur, M. Dahal And M. Ghose, "An Efficient Machine Learning Based Classification Scheme for Detecting Distributed Command & Control Traffic of P2P Botnets," I.J.Modern Education and Computer Science, 2013, 10, 9-18.
Bazydlo, P., Lasota, K., and Kozakiewicz, A., "Botnet fingerprinting method based on anomaly detection in SMTP conversations", 2017.

* cited by examiner

*Primary Examiner* — Benjamin E Lanier
(74) *Attorney, Agent, or Firm* — Vorys, Sater, Seymour and Pease, LLP

(57) ABSTRACT

In an example, simple mail traffic protocol (SMTP) traffic can be extracted from network traffic of a network. The SMTP traffic can be processed using a bot detector employing a machine learning model trained to determine whether the SMTP traffic contains a malicious SMTP session. Alert data can be provided in response to detecting the malicious SMTP session.

15 Claims, 6 Drawing Sheets

```
S: 220 smtp.server.com
C: EHLO my.example.com
S: 250 smtp.server.com
C: MAIL FROM:<sender@example.com>
S: 250 2.1.0 Ok
C: RCPT TO:<recipient@server.com>
S: 250 2.1.5 Ok
C: DATA                                  ⎫ 302
S: 354
C: Test message.                         ⎫ 304
C: .
S: 250 2.0.0 Ok
C: QUIT
S: 221 2.0.0 Bye
```

SYSTEM AND METHOD FOR DETECTING A MALICIOUS COMMAND AND CONTROL CHANNEL USING A SIMPLE MAIL TRANSFER PROTOCOL

FIELD OF THE DISCLOSURE

This disclosure relates generally to network security, and more particularly, to a system and method for detecting a malicious command and control channel using a simple mail transfer protocol (SMTP).

BACKGROUND OF THE DISCLOSURE

SMTP is an Internet standard communication protocol for electronic email transmission. Mail servers and other message transfer agents use SMTP to send and receive mail messages. User-level email clients typically use SMTP for sending messages to a mail server for relaying, and typically submit outgoing email to the mail server on a dedicated port.

A botnet is a group of Internet-connected devices, each of which runs one or more bots. Botnets can be used to perform Distributed Denial-of-Service (DDos) attacks, steal data, send spam, and allow the attacker to access the device. The owner can control the botnet using command and control software.

SUMMARY OF THE DISCLOSURE

Various details of the present disclosure are hereinafter summarized to provide a basic understanding. This summary is not an extensive overview of the disclosure and is neither intended to identify certain elements of the disclosure nor to delineate the scope thereof. Rather, the primary purpose of this summary is to present some concepts of the disclosure in a simplified form prior to the more detailed description that is presented hereinafter.

According to an embodiment, a computer-implemented method can include extracting SMTP traffic from network traffic of a network, processing the SMTP traffic using a bot detector employing a machine learning model trained to determine whether the SMTP traffic contains a malicious SMTP session, and outputting alert data in response to detecting the malicious SMTP session.

In another embodiment, a system can include memory to store machine-readable instructions and data comprising a machine learning model, and one or more processors to access the memory and execute the machine-readable instructions. The machine-readable instructions can include a network traffic filter that can be programmed to process network traffic to extract SMTP traffic, and a traffic analyzer programmed to determine, using the machine learning model, whether the SMTP traffic contains messages with data content that does not conform to a known email standard or contains a sequence and/or syntax of SMTP commands for an SMTP session associated with an SMTP session between a bot a command and control server, and output alert data in response to detecting the SMTP session between the bot and the command and control server.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

FIG. 3 is an example of an SMTP session between an SMTP client and server.

DETAILED DESCRIPTION

Figure 1:
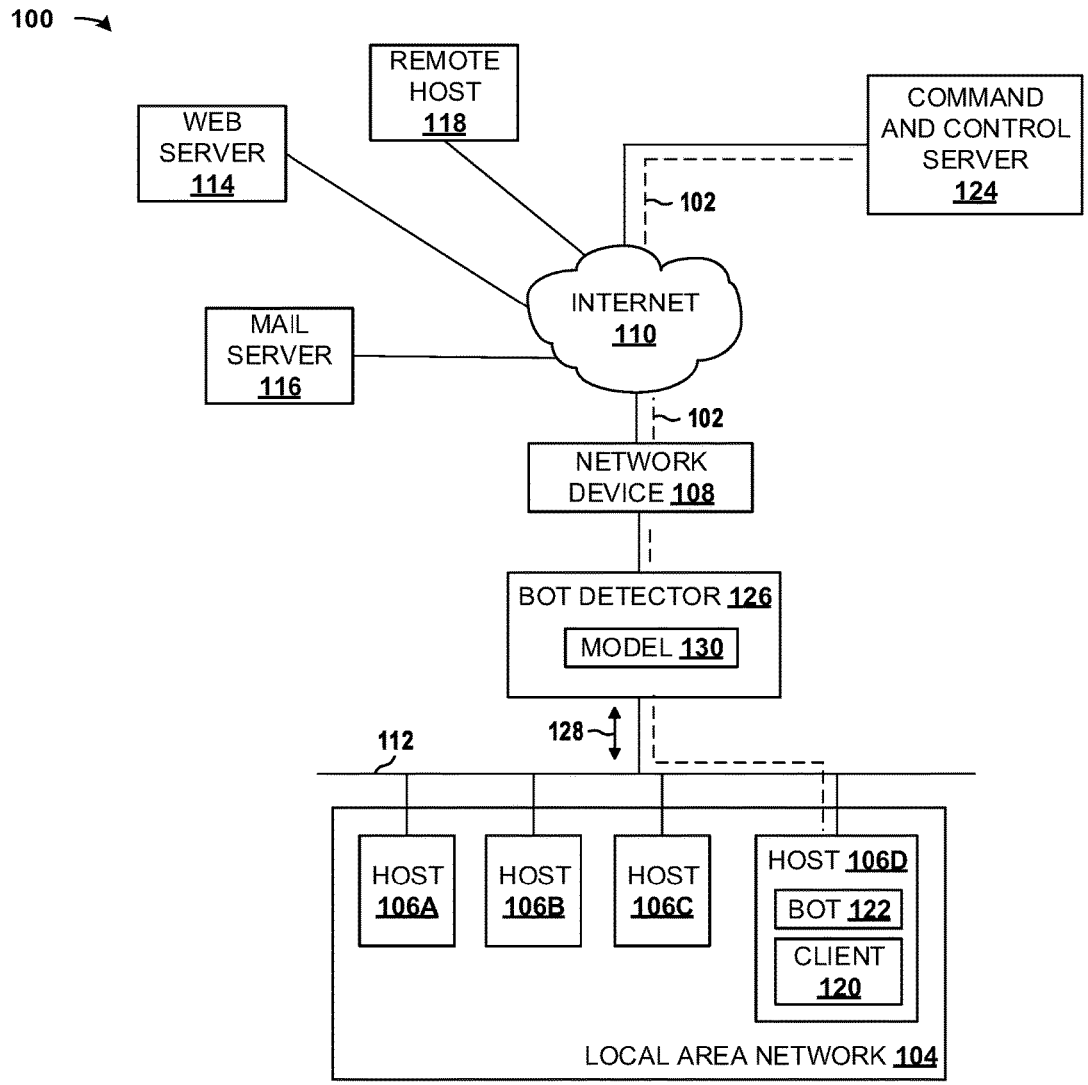
FIG. 1 is an example of a network environment.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to detecting a command and control channel that uses SMTP. In examples herein, a bot detector can be employed on a network to receive or capture network traffic of the network. The bot detector can extract SMTP traffic from the received network traffic. The bot detector can employ a machine learning model trained to determine whether the SMTP traffic contains an SMTP session between a bot executing on the network and a command and control server outside the network. The bot detector can output alert data in response to detecting the SMTP session between the bot and the command and control server. By using the bot detector on the network conversations (e.g., transmitted messages and/or data) between the bot and the command control server can be detected and thus improve a security of the network presented by bots and command control servers that use SMTP.

FIG. 1 is an example of a network environment 100 in which systems and methods described herein can be implemented in accordance with certain embodiments. One or more elements of FIG. 1 can be coupled to one another through network interfaces or through any other suitable connection (wired or wireless), which can provide a pathway for network communications. Additionally, any one or more of these elements can be combined or removed from the architecture based on particular configuration needs. Network environment 100 may include a configuration capable of transmission control protocol/Internet protocol (TCP/IP) communications for the transmission or reception of packets (e.g., IP packets) in a network. The network environment 100 can also operate in conjunction with a user datagram protocol/IP (UDP/IP), or any other suitable protocol where appropriate and based on particular needs.

The network environment 100 includes a local area network (LAN) 104 that can include a number of nodes, such as hosts 106A-106D. The hosts 106A-106D can communicate with a network device 108, which can provide packets to and receive packets from an Internet 110. Each of the hosts 106A-106D can communicate with the network device 108 through a connection medium 112. The connection medium 112 can include any combination of wired and/or wireless connections, and/or network interfaces to provide a pathway for network communication. A node, in general, is any system, machine, device, network element, client, server, peer, service, application, or other object capable of sending and receiving data on a network. Thus, in some instances, the hosts 106A-106D may be any type of node capable of running a program. A host can include an input device and an output device, and in some instances, can include interfaces for interacting with a user. For example, the host can be a desktop computer, workstation computer, server, laptop, table computer, mobile telephone, or any other type of stationary or portable computing device.

In some examples, the network device 108 is a network element representative of any network appliance, server, router, switch, gateway, bridge, load-balancer, firewall, intrusion prevention system, processors, modules, or any other suitable device, component, element, or object operable to exchange information in the network environment 100. A network element may include any suitable hardware, software, components, modules, interfaces, or objects that facilitate the operations thereof. The network element can include appropriate algorithms and communication protocols that allow for the effective exchange of data or information. Links can be established between nodes in the network environment 100 and can represent any medium through which two nodes can communicate. The medium may be a tangible medium, such as a wire or a fiber optic cable, or an intangible medium, such as a radio wave for wireless communication. Thus, each of the hosts 106A-106D can communicate with each other and other remote nodes connected to the Internet 110, such as a web server 114, a mail server 116, and/or a remote host 118, as shown in FIG. 1.

In some examples, one or more of the hosts 106A-106D can exchange email messages with the remote host 118 through the mail server 116. For, example, the host 106D can include an email client 120 that can be used by a user to compose an email. Email is a form of electronic communication between nodes and/or servers based on a communication protocol called SMTP. SMTP operates at an application layer (e.g., of an Open System Interconnection (OSI) model). Thus, SMTP can be used for transmitting emails between email servers and from email clients, such as the email client 120, to email servers, such as the mail server 116. SMTP relies on services of underlying layers of a TCP/IP suite to provide data transfer services.

In some examples, the mail server 116 supports SMTP and can be referred to as a mail transport agent (MTA) or an SMTP server, and can be used to route emails, for example, to the remote host 118, and in other examples, to a command and control (C2) server 124. The email client 120 can be referred to as a mail user agent (MUA), such as Microsoft Outlook™. To send an email, the email client 120 connects to the mail server 116, which receives the email from the email client 120 and routes it to another mail server. An intermediary mail server can be used to forward the email yet to another mail server until the email reaches a destination, where the email is stored in a mailbox accessible by a recipient, for example, via the remote host 118.

Once a message with data content (e.g., email content) is provided by the email client 120, the application layer can encapsulate the message and place a header field and pass the encapsulated message to a presentation layer of the OSI model. In some instances, the presentation layer can place presentation header information, and convert text of the data content to ASCII. The presentation layer passes an encapsulated message in some instances with the presentation header information to a session layer, which adds session header information (e.g., for managing data flow, for example setting up a session), and passes this information to a transport layer. The transport layer can define a port for transmitting the message, for example, a TCP or a UPD port. The transport layer can use a TCP or UPD. TCP or UPD encapsulated message can be passed from the transport layer to a network layer, which uses an IP to add source and/or destination addresses and packetize the encapsulated message into a number of packets, or IP packets. The packets can be passed through a data link layer and to a physical layer, and transmitted to the mail server 116, which causes the packets to be routed to the remote host 118, at which the above process is repeated to recover the data content provided by the email client 120. In some examples, the message is from a bot 122, as shown in FIG. 1, and one or more packets with data content from the bot 122 can be provided to the mail server 116, which can cause the one or more packets to be routed to the C2 server 124.

In some examples, the application layer or the email client 120 can conform each email to an Internet Message Format (IMF) standard. IMF is an email message standard and is a standardized ASCII-based syntax used by SMTP for emails that are processed by an MTA, for example, the mail server 116, in some instances. For example, an IMF-compliant email message consists of a header section that includes defined fields followed, optionally, by a body. The header section is a sequence of lines of characters with special syntax as defined by the IMF standard. The body can be a sequence of characters that follows the header section and are separated from the header section by an empty line. In some examples, the IMF-compliant email message can include a message envelope, which contains all of the information needed for delivery and transmission of a message. For example, the message envelope can be created by the MUA, for example, the email client 120. The message envelope can include a message (e.g., data content), which makes up the object to be delivered to a recipient, and consists of an ASCII text.

Examples are described herein wherein the host 106D includes the email client, however, in other examples, the host 106A-106C can include respective email clients for sending emails to the remote host 118, or one or more different hosts. In the example of FIG. 1, the host 106D is compromised by the bot 122, but in other examples, any of the hosts 106A-106D can be compromised by a respective bot, and in some scenarios, by a similar bot as the bot 122. In some instances, the bot 122 can spread to the hosts 106A-106C to form a botnet.

The bot 122 can represent malicious software ("malware") that can be under a control of remote software, device, machine, or system, such as the C2 server 124, as shown in FIG. 1. During a covert session 102, between the bot 122 and the C2 server 124, the C2 server 124 can control the bot 122, for example, to carry out different botnet attacks, such as email attacks. Thus, botnets or bots can also be employed to carry out email attacks, such as a spamming attack, phishing attack, or a different type of email attack. The bot 122 and the C2 server 124 can communicate during the covert session 102 using SMTP. Thus, the covert session 102 is an SMTP session between the bot 122 and the C2 server 124.

During the covert session 102, the bot 122 and the C2 server 124 can exchange data. The C2 server 124 can exploit a backdoor created to carry out different types of malicious activities on the host, for example, spreading malware to other hosts, DoS attacks, data exfiltration (e.g., through DNS tunneling), destruction of data, or email attacks. A logical connection or channel can be established between the bot 122 and the C2 server 124 during the covert session 102. The logical channel can be used for controlling and commanding the bot 122 for malicious activities (e.g., email attacks). A session between the bot 122 and the C2 server 124 can be referred to herein as a "covert session" because it is unwanted communication for the network 104.

For example, the C2 server 124 can instruct the bot 122 to carry out the email attack. The C2 server 124 can instruct the bot 122 to send a number of email messages that mimic or represent messages sent by the email client 120. The C2 server 124 can send instructions and/or data to the bot 122 to initiate the email attack. The bot 122 can construct email messages with malware or fraudulent information, and exploit an SMTP port that is used by the email client 120 to send these messages to a recipient (e.g., a user, a service, an application, a program, etc.), for example, of the remote host 118 or any of hosts 106A-106C.

In some examples, the bot 122 can control and use the email client 120 to construct email messages for the email attack. The C2 server 124 can use SMTP to send one or more messages with instructions and/or data for initiating the email attack to the bot 122. In some examples, the one or messages are email messages and are routed to a respective mail server for the C2 server 124 that can relay the email messages to the mail server 116, which can provide the email messages to the host 106D. By way of further example, the C2 server 124 can include mail server functionality, and the C2 server 124 can provide the email message to the mail server 116.

The bot 122 can respond to the C2 server 124 with a message with data content that adheres to the IMF standard. The bot 122 can use SMTP to output a response message to the C2 server 124 based on the instructions and/or data from the C2 server 124. In some examples, the response message is an email response message and is provided to the mail server 116, which can route the email response message to the respective mail server for the C2 server 124. The respective mail server can provide the email response message to the C2 server 124. In some implementations, the bot 122 uses the email client 120 to construct the email response message. Thus, in some examples, the covert session 102 can extend to include one or more respective mail servers, and intermediary servers, if applicable. The bot 122 can exploit an SMTP port that is currently used for the email client 120 to communicate with the C2 server 124, as shown in FIG. 1. For example, port 25 (not shown) can be used for transmitting messages, however, in other examples, a different SMTP port can be used (e.g., port 487, 587, or another port that is currently being used by the email client 120) for the data content sent by the bot 122 for the C2 server 124. In other examples, the bot 122 uses a different port that is not being used by the email client 120 for communication with the C2 server 124.

The message produced by the bot 122 appears (e.g., at the transport layer) as authentic message sent by the email client 120 to existing blacklisting and filtering mechanisms. As such, spam-sending patterns can be constructed between the bot 122 and the C2 server 124 that evade these existing mechanisms (e.g., software, devices, etc.). This is because bot traffic between the bot 122 and the C2 server 124 during the covert session 102 appears to existing blacklisting and filtering mechanisms as authentic email traffic rather than bot traffic. Thus, the covert session 102 established between bot 122 and the C2 server 124 using the SMTP can evade existing network detection and filtering techniques to command and control the bot 122, for example, to carry the email attack.

In accordance with certain embodiments, the network environment 100 includes a bot detector 126, which can be configured to detect and finger print command and control messages during the covert session 102. By employing the bot detector 126 in the network environment 100, sequence and syntax of SMTP commands during email delivery between an infected host (e.g., the host 106D) and a C2 server (e.g., the C2 server 124) can be detected. The bot detector 126 can be configured to monitor network traffic 128 on the LAN 104 and thus data flowing to and/or from the Internet 110. The bot detector 126 can process the network traffic 128 to detect communications between the bot 122 and the C2 server 124, and thus the covert session 102. The example of FIG. 1 illustrates the bot detector 126 as implemented as a stand-alone element. In other examples, the bot detector 126 can be implemented on the network device 108, at the host 106D, a different host, or at another network device that can be coupled to the LAN 104 to monitor the network traffic 128. Further, while the example of FIG. 1 illustrates the network device 108 and/or the bot detector 126 as implemented outside the LAN 104, in other instances, the network device 108 and/or bot detector 126 can be implemented within the LAN 104.

In certain embodiments, the bot detector 126 can capture or receive the network traffic 128. The network traffic 128 could include SMTP traffic, as well as other types of traffic (e.g., web traffic). SMTP traffic can include one more packets (e.g., IP packets) that contain a message from and/or to the email client 120 and/or bot 122. Network traffic originating and being received by the host 106D for the bot 122 can be referred to herein as bot traffic. Thus, bot traffic can be composed of one or more packets. The bot detector 126 can process the network traffic 128 to identify the SMTP traffic.

In some examples, the bot detector 126 includes a machine learning model 130 trained on a known sequence and/or syntax of SMTP commands observed during an SMTP session between one or more hosts of the hosts 106A-106D and one or more mail servers, for example including the mail server 116. The machine learning model 130 can identify SMTP communications that are outside of normal SMTP communications for the LAN 104. In some examples, the machine learning model 130 is trained using a repository or previously captured SMTP traffic with data content that conforms to an email standard. While examples are described herein wherein the email standard is the IMF standard, in other examples, a different email format can be used. Because the machine learning model 130 has been trained on email messages with respective data content that conforms to a known email standard, the machine learning model 130 can identify or detect messages with data content in SMTP traffic that do not conform to the known email standard. For example, the data content, in some instances, can include a header (e.g., a subject, a sender, a data and time received, a reply-to, a recipient, a recipient email address, and/or attachments), and a body (e.g., text, graphical elements, and/or signatures).

The machine learning model 130 can process the network traffic 128 to detect the covert session 102. For example, the machine learning model 130 can determine that a respective message originating from the host 106D from the SMTP traffic has data content that does not comply with the known email standard. Because the respective message does not adhere to the known email standard, the machine learning model 130 can flag (e.g., label or identify) the respective message. For example, one or more packets that include the respective message can be flagged by the machine learning model 130 as potential bot traffic. For example, the respective message can include one or more special and/or escape characters or a built in commands such as ping, netcat, netstat, etc. In additional or alternative examples, the respective message can identify or includes a number of different IP addresses.

In some examples, the machine learning model 130 can determine that a sequence and/or syntax of SMTP commands for one or messages of the network traffic 128 does not match or has deviated outside an acceptable range of historical or known sequence and/or syntax of SMTP commands on which the machine learning model 130 has been trained. For example, termination of connection after an EHLO command (e.g., as shown in FIG. 3) can be an indication of a DDOS or other attack.

In additional examples, the machine learning model 130 can be trained to analyze a header of packets of the network traffic 128. For example, the machine learning model 130 can be trained on a list of IP addresses for one or more known C2 servers, which in some instances can include the C2 server 124. The machine learning model 130 can evaluate the network traffic 128 or the SMTP traffic to identify any packets with IP addresses that match the list of IP addresses and flag those packets as potential bot traffic.

In additional or alternative examples, the machine learning model 130 can be trained on a time to live (TLL) for a packet. TLL can refer to an amount of time or hops that a packet is set to exist inside a network before being discarded. Thus, a TLL value within a packet gets decremented as the packet moves through intermediary devices toward a destination. The machine learning model 130 can be trained on known TLL values for the network traffic 128. For example, the machine learning model can be trained on known TLL values for SMTP traffic associated with the email client 120. The machine learning model 130 can evaluate the network traffic 128 or the SMTP traffic to determine whether a TLL value from a packet therein exceeds a threshold or is not within a defined TLL value range. The machine learning model 130 can flag each packet with the TLL value that exceeds the threshold or is not within the defined TLL value range as potential bot traffic. In some examples, the machine learning model 130 can extract the TLL value from a SYN packet of the network traffic 128. The machine learning model 130 can evaluate the TLL value extracted from the SYN packet relative to the threshold or the TLL value range to determine whether to flag the SYN packet as potential bot traffic. SYN packets can be generated when a client attempts to start a TCP connection with a server, and the client and server exchange a series of messages. Thus, the machine learning model 130 can identify SYN packets during the covert session 102 between the bot 122 and the C2 server 124.

In additional or alternative examples, the machine learning model 130 can be trained on known completion times for a handshake between a client and a server. For example, the machine learning model 130 can be trained on known completion times for a two-way, three-way, or four-way handshake between a client and a server. As an example, the client can be an email client, such as the email client 120, and the server can be a mail server, such as the mail server 116, as shown in FIG. 1. Thus, the machine learning model 130 in some instances can be trained on a three-way handshake setup time for creating a TCP socket for data transmission between the client and server. The machine learning model 130 can evaluate an amount of time that it takes for a respective client on one of the hosts 106A-106D to setup a connection with a respective server based on the network traffic 128. In a given example, the respective client is the bot 122 and the respective server is the C2 server 124. A completion time for establishing the connection between bot 122 and the C2 server 124 can exceed a setup time threshold or be outside a setup time range in the given example. The machine learning model 130 can flag packets associated with the handshake between the bot 122 and the C2 server 124 as potential bot traffic from the network traffic 128.

In additional or alternative examples, the machine learning model 130 can be trained to detect a number of handshakes and/or a frequency of handshakes that a client is establishing with a server. The machine learning model 130 can be trained on known handshake parameters for a respective client and/or server. For example, the machine learning model 130 can determine the number of handshakes and/or the frequency of handshakes that a respective client of a host of the hosts 106A-106D establishes over a period of time (e.g., within an hour, a few hours, day, days, or one or more months) based on network traffic 128 captured during the period of time. If the number of handshakes and/or the frequency of handshakes that the respective client establishes exceeds a handshake threshold and/or is outside a threshold range, the machine learning model 130 can flag one or more packets associated with the handshake between the bot 122 and the C2 server 124 as potential bot traffic.

In some examples, the machine learning model 130 can be trained to detect client-server sessions or connections (e.g., logical connections) during which a large amount of data is transferred over a period of time. For example, the machine learning model 130 can be trained on known or approved data size limits for data that has been transferred over the LAN 104, or transmitted by a respective client on a host. The machine learning model 130 can evaluate the network traffic 128 to detect transfer of data over the period of time exceeding a data transfer threshold. The machine learning model 130 can flag one or more packets associated with the transfer of data between the bot 122 and the C2 server 124 from the network traffic 128 as potential bot traffic.

Accordingly, by employing the bot detector 126 in the network environment 100 malicious conversations (e.g., that include command and control commands) between bots and a C2 server can be identified. The bot detector 126 can detect anomalies in SMTP conversations that occur on the LAN 104 corresponding to the malicious conversations between the bot 122 and the C2 server 124. Because the bot detector 126 can identify bots on a network that exploit SMTP for communication with a respective C2 server outside the network, spam email bots or botnets can be identified and brought offline to reduce bandwidth on a network as well as improve an overall cybersecurity of the network. According to the examples herein, the bot detector 126 can identify suspicious SMTP connections (e.g., the covert session 102), and once identified, in some instances, alert a user (e.g., a network administrator) for further investigation, such as determine whether the SMTP connection includes bot traffic.

Figure 2:
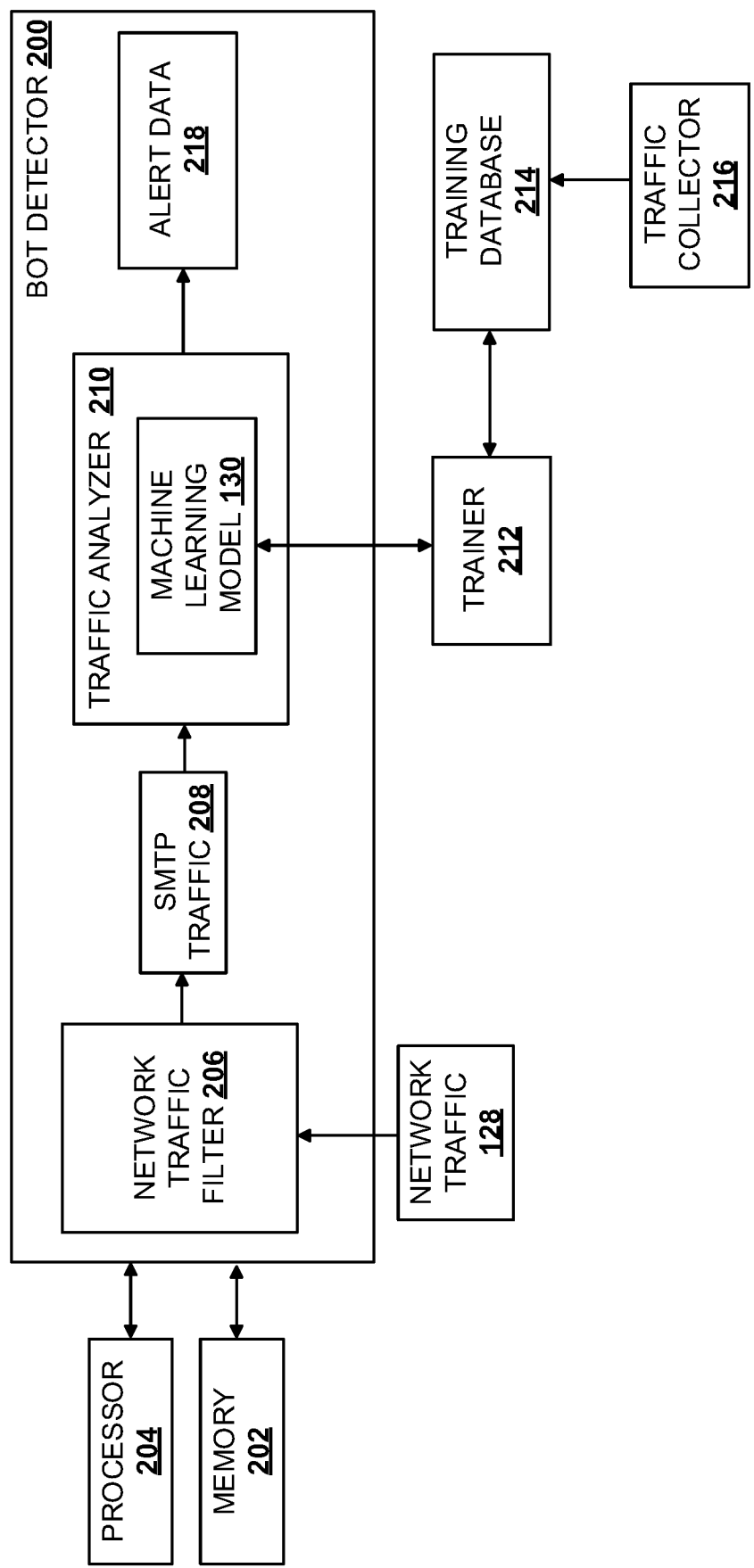
FIG. 2 is an example of a bot detector.

FIG. 2 is an example of a bot detector 200. The bot detector 200 can be implemented similar to the bot detector 126, as shown in FIG. 1, and is configured to capture inbound and outbound traffic sessions of LAN 104 and to detect SMTP dialects that do not follow, for example, an IMF standard, or match legitimate historical dialects as described in the examples herein. Thus, reference can be made to FIG. 1 in the example of FIG. 2. The bot detector 200 can be implemented using one or more modules, shown in block form in the drawings. The one or more modules can be in software or hardware form, or a combination thereof. In some examples, the bot detector 200 can be implemented as machine readable instructions that can be stored in a memory 202, as shown in FIG. 2. A processor 204 can access the memory 202 and execute the machine readable instructions to implement at least some of the functions, as described herein. By way of example, the memory 202 can be implemented, for example, as a non-transitory computer storage medium, such as volatile memory (e.g., random access memory (RAM), such as DRAM), non-volatile memory (e.g., a hard disk drive, a solid-state drive, a flash memory, or the like), or a combination thereof. The processor 204 can be implemented, for example, as one or more processor cores.

The bot detector 200 can receive or capture the network traffic 128, as shown in FIGS. 1-2. The bot detector 200 includes a network traffic filter 206 that can receive the network traffic 128 to identify SMTP traffic 208 therein. For example, the network traffic filter 206 can evaluate the network traffic 128 to identify one or more SMTP commands (e.g., a "DATA" command) and/or corresponding arguments therein and flag such network traffic as the SMTP traffic 208. In other examples, the network traffic filter 206 can implement port filtering and an SMTP port that is used by the hosts 106A-106D can be used as a filtering parameter. For example, if port 25, 587, or 465 is used for SMTP traffic on a respective host of the hosts 106A-106D, the network traffic filter 206 can flag one or more packets from the network traffic 128 that is associated with (e.g., identifies) an SMTP port to provide the SMTP traffic 208.

The bot detector 200 further includes a traffic analyzer 210 for analyzing the SMTP traffic 208 to detect a potential botnet session (e.g., the covert session 102, as shown in FIG. 1). Thus, the traffic analyzer 210 includes the machine learning model 130, as shown in FIG. 1. The machine learning model 130 can be used to detect the covert session 102 between the bot 122 and the C2 server 124, as shown in FIG. 1, as described herein.

The machine learning model 130 can be trained on a known (e.g., labelled) sequence and/or syntax of SMTP commands during one or more previous SMTP communications between one or more hosts (e.g., in some instances including the hosts 106A-106D), and one or more respective mail servers, which can include the mail server 116, as shown in FIG. 1. For example, a trainer 212 (e.g., a machine learning algorithm) can be used to train the machine learning model 130 based on the known sequence and/or syntax of SMTP commands. The machine learning algorithm can be implemented as software, hardware, and/or a combination thereof. For example, the trainer 212 can employ a learning algorithm (e.g., an unsupervised learning algorithm) to identify a subset of sequence and/or syntax of SMTP commands from previously captured network traffic. The previously captured network traffic can be stored in a training database 214, as shown in FIG. 2. In some examples, the previously captured network traffic includes previously captured SMTP traffic.

For example, a traffic collector 216 (e.g., implemented as software, hardware, and/or a combination thereof) can be used to capture network traffic for the hosts 106A-106D on the LAN 104 for a period of time (e.g., weeks, months, etc.) and store the captured network traffic in the training database 214 to provide a knowledge base for the LAN 104. The trainer 212 can process the previously captured network traffic to identify the subset of sequence and/or syntax of SMTP commands, and label this data to provide the labelled sequence and/or syntax of SMTP commands. As an example, the trainer 212 can use a clustering algorithm to process the subset of sequence and/or syntax of SMTP commands to provide the labelled sequence and/or syntax of SMTP commands. The labelled sequence and/or syntax of SMTP commands can be used by the trainer 212 to train the machine learning model 130. As an example, the machine learning model 130 is a logistic regression model.

For example, the machine learning model 130 can process the SMTP traffic 208 to determine whether the SMTP traffic 208 contains a sequence and/or syntax of SMTP commands for an SMTP communication (e.g., SMTP session) between the bot 122 and the C2 server 124. For example, the machine learning model 130 can output alert data 218 in response to detecting the sequence and/or syntax of SMTP commands during the covert session 102 between the bot 122 and the C2 server 124. The alert data 218 can identify one or more packets of the SMTP traffic 208 that is potentially bot traffic, and in some instances, the host 106D, and/or an IP address for the C2 server 124.

In additional or alternative examples, the machine learning model 130 can be trained on known data content of messages that conform to a known email standard, such as an IMF standard. For example, the trainer 212 can process the previously captured network traffic to identify a subset of messages with data content that conforms to the known email standard. The trainer 212 can use a clustering algorithm to process the previously captured network traffic to identify the subset of messages with data content that conforms to the known email standard and label this data to provide labelled emailed content for training the machine learning model 130. Accordingly, the trainer 212 can use a semi-supervised learning approach for training the machine learning model 130.

For example, the machine learning model 130 once trained on the labelled email content can process the SMTP traffic 208 to detect data content that does not adhere to a known email standard. The machine learning model 130 can determine that a respective message originating from the host 106D does not comply with the known email standard. The machine learning model 130 can flag the respective message from the SMTP traffic 208 corresponding to detecting the covert session 102. For example, one or more packets that include the data content or portions thereof can be flagged by the machine learning model 130 as potential bot traffic. The machine learning model 130 can output the alert data 218 in response to detecting that the SMTP traffic 208 includes data content that does not comply with the known email standard. The alert data 218 can identify one or more packets of the SMTP traffic 208 that is potentially bot traffic (e.g., that contain the respective message), and/or the host 106D from which the data content originated.

In additional or alternative examples, the machine learning model 130 can be trained to evaluate packet headers of packets of the SMTP traffic 208 to detect the covert session 102. For example, the trainer 212 can train the machine learning model 130 on a list of IP addresses that are known for one or more C2 servers, including the C2 server 124. The list of IP addresses can be stored in the training database 214, and thus retrieved by the trainer 212 or provided to the trainer 212. For example, the machine learning model 130 once trained based on the list of IP addresses for known C2 servers can process the SMTP traffic 208. The machine learning model 130 can output the alert data 218 in response to determining that an IP address of the C2 server 124 matches a respective one of the IP addresses. In some examples, the alert data 218 can identify the host 106D (e.g., a corresponding IP address) with which the C2 server 124 communicates.

In additional or alternative examples, the machine learning model 130 can be trained on known TLL values, which can be stored in the training database 214. For example, the trainer 212 can train the machine learning model 130 on known TLL values from previously captured network traffic (e.g., previously captured SMTP traffic) for one or more email clients, including the email client 120. The previously captured network traffic can be stored in the training database 214. In some instances, the machine learning model 130 determines that a TLL value from a packet of the network traffic 128 exceeds a threshold or is not within a TLL value range and flags the packet as potential bot traffic. The machine learning model 130 can output the alert data 218 in response to determining that the TLL value exceeds the threshold or is not within the TLL value range. The alert data 218 can identify the packet, and other software or a user can investigate the packet based on the alert data 218 to determine whether the packet is bot traffic corresponding to detecting the covert session 102.

In additional or alternative examples, the machine learning model 130 can be trained on known completion times for a handshake between a number of client and servers. For example, the trainer 212 can train the machine learning model 130 based on known completion times for a two-way, three-way, or four-way handshake based on the previously captured network traffic (e.g., previously captured SMTP traffic). As an example, the client can be an email client, such as the email client 120, and the server can be a mail server, such as the mail server 116, as shown in FIG. 1. Thus, the machine learning model 130 in some instances can be trained on a given handshake setup time for creating a TCP socket for data transmission between the client and server.

For example, the machine learning model 130 can evaluate an amount of time that it takes for a respective client on one of the hosts 106A-106D to setup a connection with a respective server based on the SMTP traffic 208. In the given example, as described herein, the completion time for establishing the connection between bot 122 and the C2 server 124 exceeds a setup time threshold or is outside a setup time range. The machine learning model 130 can flag packets associated with the handshake between the bot 122 and the C2 server 124 as potential bot traffic corresponding to detecting the covert session 102. The machine learning model 130 can output the alert data 218 in response to determining that the completion time exceeds the setup time threshold or is outside the setup time range. The alert data 218 can identify the packets associated with the handshake between the bot 122 and the C2 server 124 as potential bot traffic.

In additional or alternative examples, the machine learning model 130 can be trained to detect a number of handshakes and/or frequency of handshakes that a client is establishing with a server. The trainer 212 can train the machine learning model 130 based on known handshake parameters (e.g., approved handshake numbers and/or frequencies) for a respective client and/or server. The machine learning model 130 can determine the number of handshakes and/or the frequency of handshakes that a respective client of a host of the hosts 106A-106D establishes over a period of time based on the SMTP traffic 208 captured during the period of time. If the number of handshakes and/or the frequency of handshakes that the respective client establishes exceeds a handshake threshold and/or is outside a threshold range, the machine learning model 130 can flag packets associated with the handshake between the bot 122 and the C2 server 124 as potential bot traffic. The machine learning model 130 can output the alert data 218 identifying the packets associated with the handshake between the bot 122 and the C2 server 124 as potential bot traffic.

In additional or alternative examples, the machine learning model 130 can be trained to detect client-server connections in which a large amount of data is transferred over a defined period of time. For example, the trainer 212 can train the machine learning model 130 on known data size limits for data that can be transferred over the LAN 104, or from a respective client. The machine learning model 130 can evaluate the SMTP traffic to detect transfer of data over a period of time exceeding a data transfer threshold. The machine learning model 130 can flag packets from the SMTP traffic 208 as potential bot traffic that is associated with the transfer of the data. The machine learning model 130 can output the alert data 218 in response to detecting the transfer of data over the period of time exceeding the data transfer threshold. The alert data 218 can identify the packets from the SMTP traffic 208 associated with the data as potential bot traffic.

By using the bot detector 200 on a network (e.g., the LAN 104, as shown in FIG. 1) compromised hosts (e.g., the host 106D) that exploit SMTP can be detected that would have avoided existing blacklisting and filtering mechanisms. In signature-based models for detecting a bot (e.g., the bot 122), any minor changes in the bot will lead to bypassing a signature-based model, and thus failing to detect the bot. Because the bot detector 200 uses the machine learning model 130 for bot detection, bots can be detected post signature modification. This is because the machine learning model 130 has been trained based on a knowledge base and behavior of the bot and not only the signature for the bot. Thus, the bot detection 200 can detect the covert session 102 between the bot 122 and the C2 server 124. Moreover, signature based detecting methods cannot detect any newly introduced bots, whereas the bot detector 200 employs a trained machine learning model that can adapt and detect new bots on a host or a network.

FIG. 3 is an example of an SMTP session 300 between an SMTP client and server. In some examples, the SMTP client is an email client, such as the email client 120, and the server is an email server, such as the email server 116, as shown in FIG. 1. Thus, reference can be made to the example of FIGS. 1-2 in the example of FIG. 3. In the example of FIG. 3, the SMTP client is identified with "C" and the SMTP server is identified with "S". The SMTP session 300 includes a number of SMTP commands, for example, "EHLO," "MAIL FROM," "RCPT TO," "DATA," and "QUIT". In some examples, the SMTP server is a C2 server, such as the C2 server 124, and the SMTP client is a bot, such as the bot 122, as shown in FIG. 1.

The SMTP server can respond to the SMTP client (e.g., with a 220 command, as shown in FIG. 3). The SMTP client can respond with an EHLO command. The SMTP client can provide sender information via the "MAIL FROM" command. If the SMTP server accepts the sender's address, the SMTP server provides a recipient address via the "RCPT TO" command. The SMTP client can inform the SMTP server that email content is to be transmitted by the SMTP client via the "DATA" command, and end it with a special terminal (e.g., <CR><LF>, <CR><LF>). The SMTP session ends with the "QUIT" command from the SMTP client with the SMTP server acknowledging session completion.

In the example of FIG. 3, the "DATA" command is identified at 302, and the data content corresponds to "Test message" at 304, as shown in FIG. 3. Thus, the "Test message" at 304 can include ASCII content, for example, a message header and message body. The transmitted message at 304 can conform to an email standard (e.g., IMF standard) in embodiments wherein the SMTP client is the email client 120 and the SMTP server is the email server 116. However, in some examples, as described herein, the bot 122 can use SMTP to provide messages to the C2 server 124 wherein the message does not conform to the email standard. In some examples, the messages are routed through one or more mail servers, which can include the mail server 116, as shown in FIG. 1. In examples wherein the transmitted message at 304 that is generated or provided by the bot 122 does not conform to the email standard, as described herein, it can be detected by the bot detector 126 or 200, as shown in FIGS. 1-2, respectively. The bot detector 126 or 200 as described herein can output the alert data 218, which can be rendered on an output device (e.g., a display), for example, as described herein, when an SMTP syntax of command, such as the "DATA" command does not conform with the IMF standard. For example, the alert data 218 can be outputted in response to the bot detector 126 or 200 determining that the "Test message" at 304 does not conform to the IMF standard in examples wherein the "Test message" is generated by the bot 122. The "test message" at 304 in embodiments wherein it is generated by the bot 122 can be representative of a malicious conversation and thus can include data or other information extracted from the host 106D, or responses to instructions provided by the C2 server 124.

Figure 4:
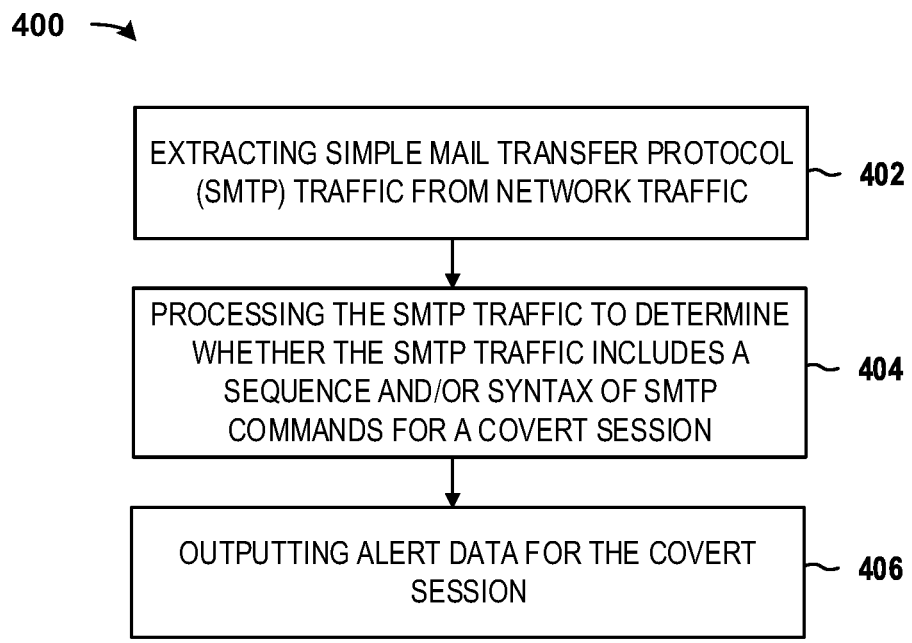
FIG. 4 is an example of a method for detecting a session between a bot and a command and control server.
Figure 5:
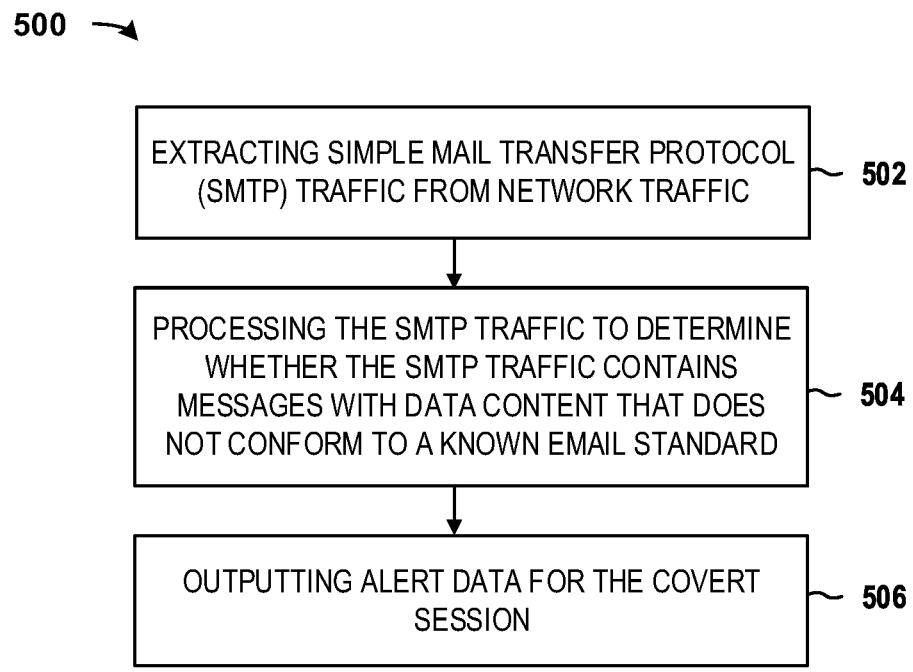
FIG. 5 is another example of a method for detecting a session between a bot and a command and control server.

In view of the foregoing structural and functional features described above, an example method will be better appreciated with reference to FIGS. 4-5. While, for purposes of simplicity of explanation, the example method of FIGS. 4-5 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the methods.

FIG. 4 is an example of a method 400 for detecting a session between a bot and C2 server. The method 400 can be implemented by the bot detector 126, as shown in FIG. 1, or the bot detector 200, as shown in FIG. 2. Thus, reference be made to the example of FIGS. 1-3 in the example of FIG. 4. The method 400 can begin at 402 by extracting SMTP traffic (e.g., the SMTP traffic 208, as shown in FIG. 2) from network traffic (e.g., the network traffic 128, as shown in FIG. 1) of a network (e.g., the LAN 104, as shown in FIG. 1). At 404, processing using a trained machine learning model (e.g., the machine learning model 130, as shown in FIGS. 1-2) the SMTP traffic to determine whether the SMTP traffic contains a sequence and/or syntax of SMTP commands for an SMTP session (e.g., the covert session 102, as shown in FIG. 1) between a bot (e.g., the bot 122, as shown in FIG. 1) and a C2 server (e.g., the C2 server 124, as shown in FIG. 1). At 406, outputting alert data (e.g., the alert data 218, as shown in FIG. 2) in response to detecting the sequence and/or syntax of SMTP commands for the SMTP session between the bot and the C2 server.

FIG. 5 is another example of a method 500 for detecting a session between a bot and C2 server. The method 500 can be implemented by the bot detector 126, as shown in FIG. 1, or the bot detector 200, as shown in FIG. 2. Thus, reference be made to the example of FIGS. 1-3 in the example of FIG. 5. The method 500 can begin at 502 by extracting SMTP traffic (e.g., the SMTP traffic 208, as shown in FIG. 2) from network traffic (e.g., the network traffic 128, as shown in FIG. 1) of a network (e.g., the LAN 104, as shown in FIG. 1). At 504, processing using a trained machine learning model (e.g., the machine learning model 130, as shown in FIGS. 1-2) the SMTP traffic to determine whether the SMTP traffic contains messages with data content that does not conform to a known email standard (e.g., the IMF standard). At 506, outputting alert data (e.g., the alert data 218, as shown in FIG. 2) in response to determining that the data content of at least one message of the SMTP traffic does not conform to the known email standard.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 6. Furthermore, portions of the embodiments may be a computer program product on a computer-usable storage medium having computer readable program code on the medium. Any non-transitory, tangible storage media possessing structure may be utilized including, but not limited to, static and dynamic storage devices, hard disks, optical storage devices, and magnetic storage devices, but excludes any medium that is not eligible for patent protection under 35 U.S.C. § 101 (such as a propagating electrical or electromagnetic signal per se). As an example and not by way of limitation, a computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, where appropriate.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 6:
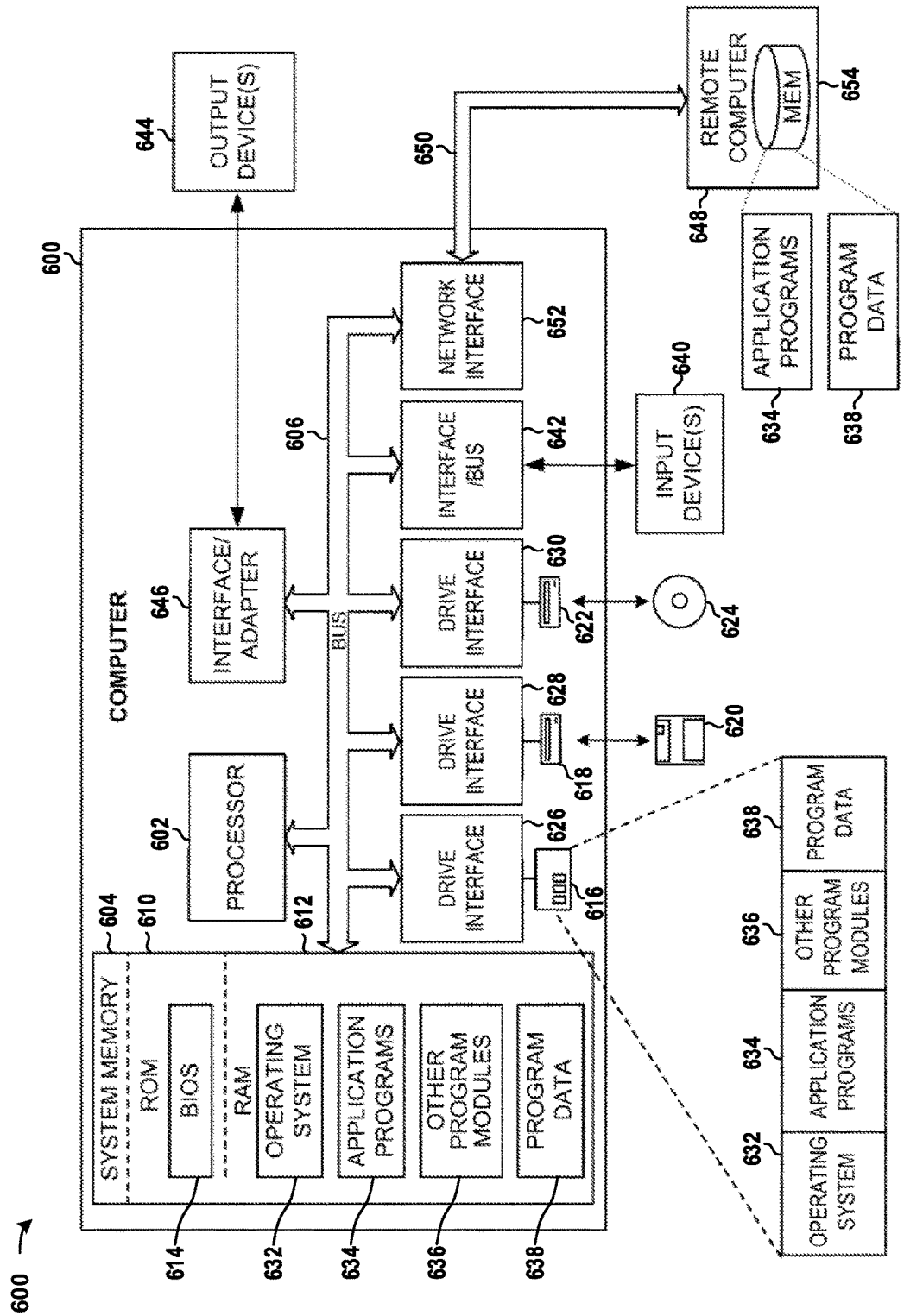
FIG. 6 depicts an example computing environment that can be used to perform methods according to an aspect of the present disclosure.

In this regard, FIG. 6 illustrates one example of a computer system 600 that can be employed to execute one or more embodiments of the present disclosure. Computer system 600 can be implemented on one or more general purpose networked computer systems, embedded computer systems, routers, switches, server devices, client devices, various intermediate devices/nodes or standalone computer systems. Additionally, computer system 600 can be implemented on various mobile clients such as, for example, a personal digital assistant (PDA), laptop computer, pager, and the like, provided it includes sufficient processing capabilities.

Computer system 600 includes processing unit 602, system memory 604, and system bus 606 that couples various system components, including the system memory 604, to processing unit 602. Dual microprocessors and other multi-processor architectures also can be used as processing unit 602. System bus 606 may be any of several types of bus structure including a memory bus or memory controller, a peripheral bus, and a local bus using any of a variety of bus architectures. System memory 604 includes read only memory (ROM) 610 and random access memory (RAM) 612. A basic input/output system (BIOS) 614 can reside in ROM 610 containing the basic routines that help to transfer information among elements within computer system 600.

Computer system 600 can include a hard disk drive 616, magnetic disk drive 618, e.g., to read from or write to removable disk 620, and an optical disk drive 622, e.g., for reading CD-ROM disk 624 or to read from or write to other optical media. Hard disk drive 616, magnetic disk drive 618, and optical disk drive 622 are connected to system bus 606 by a hard disk drive interface 626, a magnetic disk drive interface 628, and an optical drive interface 630, respectively. The drives and associated computer-readable media provide nonvolatile storage of data, data structures, and computer-executable instructions for computer system 600. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and RAM 610, including operating system 632, one or more application programs 634, other program modules 636, and program data 638. In some examples, the application programs 634 can include the bot detector 126, as shown in FIG. 1, or the bot detector 200, as shown in FIG. 2. The application programs 634 and program data 638 can include functions and methods programmed for detecting malicious communications between a bot (e.g., the bot 122, as shown in FIG. 1) and a C2 server (e.g., the C2 server 124, as shown in FIG. 1). In some examples, the application programs 634 can include the trainer 212 and the traffic collector 216, as shown in FIG. 2, and the program data 638 can include the training database 214, as shown in FIG. 2.

A user may enter commands and information into computer system 600 through one or more input devices 640, such as a pointing device (e.g., a mouse, touch screen), keyboard, microphone, joystick, game pad, scanner, and the like. These and other input devices are often connected to processing unit 602 through a corresponding port interface 642 that is coupled to the system bus, but may be connected by other interfaces, such as a parallel port, serial port, or universal serial bus (USB). One or more output devices 644 (e.g., display, a monitor, printer, projector, or other type of displaying device) is also connected to system bus 606 via interface 646, such as a video adapter. In some examples, a respective output device of the one or more output devices 644 can be used for displaying the alert data 218, as shown in FIG. 2.

Computer system 600 may operate in a networked environment using logical connections to one or more remote computers, such as remote computer 648. Remote computer 648 may be a workstation, computer system, router, peer device, or other common network node, and typically includes many or all the elements described relative to computer system 600. The logical connections, schematically indicated at 650, can include a local area network (LAN) and a wide area network (WAN). When used in a LAN networking environment, computer system 600 can be connected to the local network through a network interface or adapter 652. When used in a WAN networking environment, computer system 600 can include a modem, or can be connected to a communications server on the LAN. The modem, which may be internal or external, can be connected to system bus 606 via an appropriate port interface. In a networked environment, application programs 634 or program data 638 depicted relative to computer system 600, or portions thereof, may be stored in a remote memory storage device 654.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof. In addition, the use of ordinal numbers (e.g., first, second, third, etc.) is for distinction and not counting. For example, the use of "third" does not imply there must be a corresponding "first" or "second." Also, as used herein, the terms "coupled" or "coupled to" or "connected" or "connected to" or "attached" or "attached to" may indicate establishing either a direct or indirect connection, and is not limited to either unless expressly referenced as such.

The invention claimed is:

1. A computer-implemented method comprising:
extracting simple mail traffic protocol (SMTP) traffic from network traffic of a network;
processing the SMTP traffic using a bot detector employing a machine learning model trained to determine whether the SMTP traffic contains a malicious SMTP session, wherein training the machine learning model is based on at least:
a list of internet protocol (IP) addresses that are associated with one or more command and control servers;
known completion times for a given handshake based on previously captured network traffic; and
determining that a completion time for establishing a handshake during the malicious SMTP session exceeds a setup time threshold or is outside a setup time range to identify potential bot traffic; and
outputting alert data in response to detecting the malicious SMTP session, wherein the alert data identifies:
an IP address for a host on the network that includes a bot; and
one or more packets associated with the handshake between the bot and the command and control server.

2. The computer-implemented method of claim 1, wherein the processing comprises determining, using the machine learning model, whether the SMTP traffic contains messages with data content that does not conform to a known email standard.

3. The computer-implemented method of claim 2, wherein the alert data identifies one or more packets of the SMTP traffic corresponding to bot traffic.

4. The computer-implemented method of claim 1, wherein the processing comprises determining, using the machine learning model, whether the SMTP traffic contains a sequence and/or syntax of SMTP commands associated with the malicious SMTP session.

5. The computer-implemented method of claim 4, wherein the alert data identifies one or more packets of the SMTP traffic corresponding to bot traffic.

6. The computer-implemented method of claim 1, wherein the extracting comprises one of:
identifying one or more SMTP commands and/or corresponding SMTP arguments in the network traffic and flagging associated packets to provide the SMTP traffic; and
implementing port filtering on the network traffic based on an SMTP port to identify packets associated with the respective SMTP port to provide the SMTP traffic.

7. The computer-implemented method claim 1, further comprising:
identifying, using a learning algorithm, a subset of sequence and/or syntax of SMTP commands from previously captured network traffic;
training the machine learning model based on the subset of sequence and/or syntax of SMTP commands; and
determining, using the machine learning model, whether the SMTP traffic contains a sequence and/or syntax of SMTP commands associated with the malicious SMTP session.

8. The computer-implemented method of claim 7, further comprising:
training the machine learning model based on a subset of messages with data content that conforms to a known email standard from the previously captured network traffic; and
determining, using the machine learning model, whether the SMTP traffic contains messages with data content that does not conform to the known email standard.

9. The computer-implemented method of claim 8, wherein the known email standard is an Internet Message Format (IMF) standard.

10. The computer-implemented method of claim 9, further comprising:
determining, using the machine learning model, that an IP of the command and control server matches a respective one of the IP addresses, the alert data identifying the host that includes the bot.

11. The computer-implemented method of claim 10, further comprising:
training the machine learning model further based on known time to live (TTL) values from the previously captured network traffic; and
determining that a TLL value from a packet of the SMTP traffic exceeds a threshold or is not within a TLL value range to identify potential bot traffic, the alert data identifying the packet with the TLL value that exceeds the threshold or is not within the TLL value range.

12. A system comprising:
memory to store machine-readable instructions and data comprising a machine learning model;
one or more processors to access the memory and execute the machine-readable instructions,
the machine-readable instructions comprising:
a network traffic filter programmed to process network traffic to extract simple mail transfer protocol (SMTP) traffic;
a traffic analyzer programmed to:
determine, using the machine learning model, whether the SMTP traffic contains messages with data content that does not conform to a known email standard or contain a sequence and/or syntax of SMTP commands associated with an SMTP session between a bot and a command and control server, wherein the machine learning model is trained based on at least:
a list of internet protocol (IP) addresses that are associated with the one or more command and control servers; and
known completion times for a given handshake based on previously captured network traffic;
determine that a completion time for establishing a handshake during the SMTP session exceeds a setup time threshold or is outside a setup time range to identify potential bot traffic; and
output alert data in response to detecting the SMTP session between the bot and the command and control server, wherein the alert data identifies:

an IP address for a host on the network that includes the bot; and one or more packets associated with the handshake between the bot and the command and control server.

13. The system of claim 12, wherein the alert data identifies one or more packets of the SMTP traffic corresponding to bot traffic.

14. The system of claim 13, wherein the known email standard is an Internet Message Format (IMF) standard.

15. The system of claim 12, wherein the traffic analyzer is further programmed to determine, using the machine learning model, that an IP of the command and control server matches a respective one of the IP addresses, the alert data identifying the host that includes the bot.

* * * * *